United States Patent
Chintala et al.

[11] Patent Number: 6,148,079
[45] Date of Patent: Nov. 14, 2000

[54] HINGE APPARATUS FOR FLIP STYLE PORTABLE PHONE

[75] Inventors: Thomas J. Chintala; Jose F. Olivas, both of San Diego, Calif.; Martin J. Kimbell, Round Lake Beach; Miguel A. Cano, Jr., Schaumburg, both of Ill.

[73] Assignee: Qualcomm Incorporated, San Diego, Calif.

[21] Appl. No.: 09/045,155

[22] Filed: Mar. 19, 1998

[51] Int. Cl.[7] ................................................ H04M 1/00
[52] U.S. Cl. ............................................................ 379/433
[58] Field of Search ............................... 379/433, 428; 16/303, 277, 330, 334, 329, 325; 455/575, 90

[56] References Cited

U.S. PATENT DOCUMENTS

| | | | |
|---|---|---|---|
| 5,111,503 | 5/1992 | Takagi | 379/433 |
| 5,257,310 | 10/1993 | Takagi et al. | 379/433 |
| 5,507,013 | 4/1996 | Weadon et al. | 455/90 |
| 5,640,690 | 6/1997 | Kudrna | 455/89 |
| 5,649,309 | 7/1997 | Wilcox et al. | 455/90 |
| 5,651,063 | 7/1997 | Ji et al. | 379/433 |
| 5,661,797 | 8/1997 | Leman et al. | 379/433 |
| 5,704,094 | 1/1998 | Hartigan et al. | 379/433 |
| 5,937,062 | 8/1999 | Sun et al. | 379/433 |

FOREIGN PATENT DOCUMENTS

| | | | |
|---|---|---|---|
| 0801489 | 3/1997 | European Pat. Off. | H04M 1/02 |

*Primary Examiner*—Jack Chiang
*Attorney, Agent, or Firm*—Philip Wadsworth; Roger W. Martin; Thomas Streeter

[57] ABSTRACT

A hinge apparatus has relatively rotatable first and second parts, one of which is adapted to be secured to the phone housing and the other of which is adapted to be secured to a cover. One of the parts comprises a cam and the other comprises a follower, the cam having end stops corresponding to an open and a closed position of the cover relative to the housing, and a convex surface between the end stops to provide initial resistance to rotation of the cover out of the open and closed positions. The parts are spring loaded such that the cover is snapped into the open and closed positions, respectively, once the follower passes the arcuate surface of the cam.

18 Claims, 3 Drawing Sheets

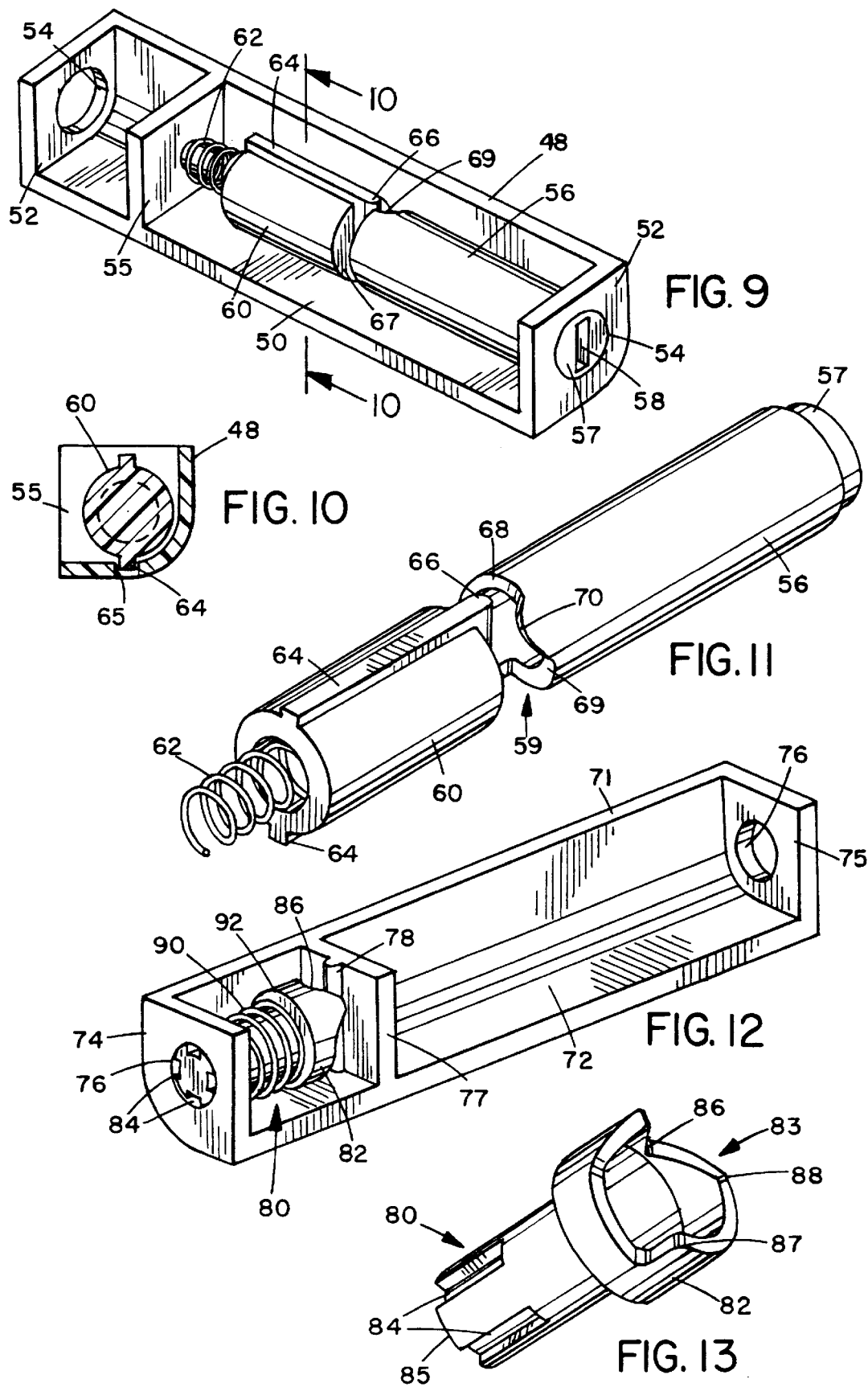

HINGE APPARATUS FOR FLIP STYLE PORTABLE PHONE

BACKGROUND OF THE INVENTION

The present invention relates generally to portable phones with a hinged lid or cover, and is particularly concerned with a hinge apparatus for connecting the lid or cover to the phone housing.

Existing portable phones with a hinged cover typically have hinges which have several complex metal and plastic parts which must be assembled properly into the phone during manufacture. This adds considerably to the expense and complexity of phone manufacture. The complex design and number of parts making up the hinge also make the apparatus more susceptible to mechanical flaws and malfunctions.

SUMMARY OF THE INVENTION

It is an object of the present invention to provide a new and improved hinge apparatus for connection between a portable phone housing and cover.

According to the present invention, a hinge apparatus is provided which comprises relatively rotatable first and second parts, one of which is adapted to be secured to a portable phone housing and the other of which is adapted to be secured to a cover, and the two parts being rotatably connected together in a phone housing. One of the parts comprises a cam and the other comprises a follower, the cam having end stops corresponding to an open and a closed position of the cover relative to the housing, and an arcuate surface between the end stops to provide resistance to rotation of the cover out of the open and closed positions. Preferably, the part secured to the cover is spring loaded such that the cover is snapped into the open and closed positions, respectively, once the follower passes the arcuate surface of the cam.

In a preferred embodiment of the invention, the follower is fixed to the housing and the cam is rotatably mounted in an opening in the housing, and spring biased towards the follower. The cam is secured to the cover so that the cam rotates with the cover as it is moved between the open and closed positions. Preferably, the follower comprises a projection or rib and the cam has an end face with a pair of indents corresponding to the open and closed positions, and a generally arcuate or convex connecting portion between the indents. As the follower travels up one side of the convex portion, the biasing spring will be compressed since the cam will be forced away from the follower. Once the follower passes over the crest of the convex portion, the spring will bias the cam back against the follower and snap the cam around until the follower again rests in an indent, at the same time moving the cover into the open or closed position.

The hinge apparatus has a minimum of parts and is easy to assemble in the phone. It operates reliably to hold the cover in either the open or closed position and resist movement away from that position unless the user positively urges the cover towards the opposite position. Once the cover has moved a predetermined distance towards the open or closed position, sufficient for the follower to clear the crest of the arcuate or convex cam portion, the cover will be snapped into the opposite position by the compressed biasing spring.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 9 is a perspective view of an alternative hinge arrangement;

FIG. 10 is a sectional view taken on line 10—10 of FIG. 9;

FIG. 11 is an enlarged perspective view of the hinge components of FIG. 9;

FIG. 12 is a perspective view of a further hinge configuration; and

FIG. 13 is an enlarged perspective view of the cam element of FIG. 12.

DESCRIPTION OF THE PREFERRED EMBODIMENT

Figure 1:
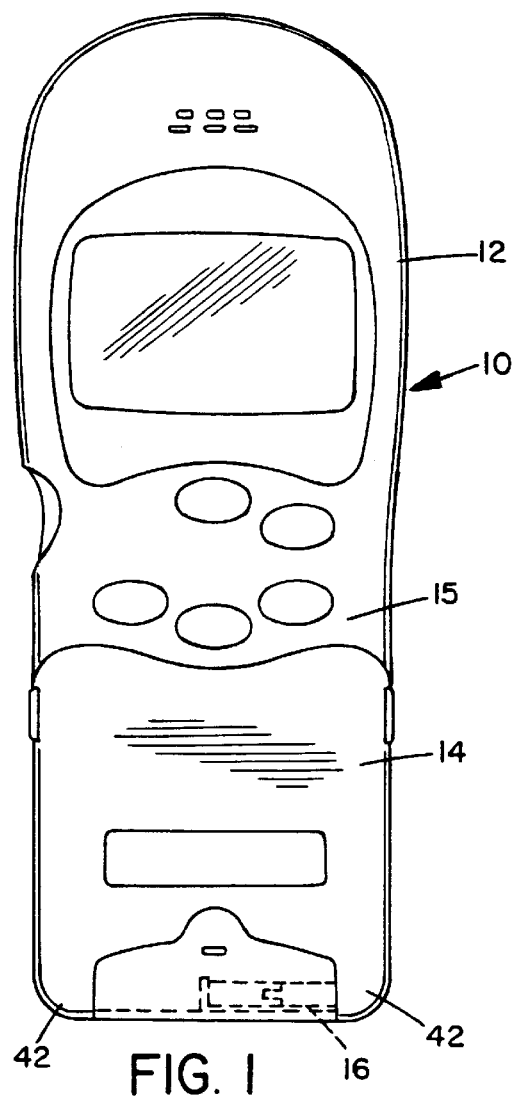
FIG. 1 is a front view of a flip type portable phone showing the location of a hinge apparatus according to a first embodiment of the invention.
Figure 2:
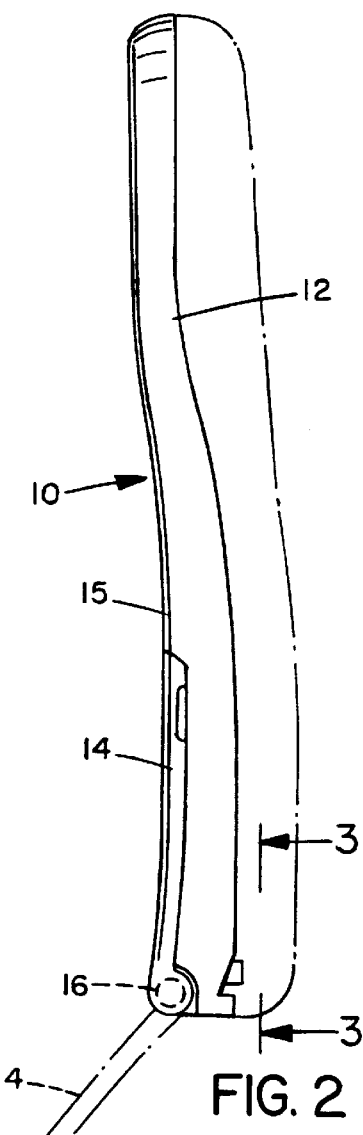
FIG. 2 is a side view of the front housing.
Figure 3:
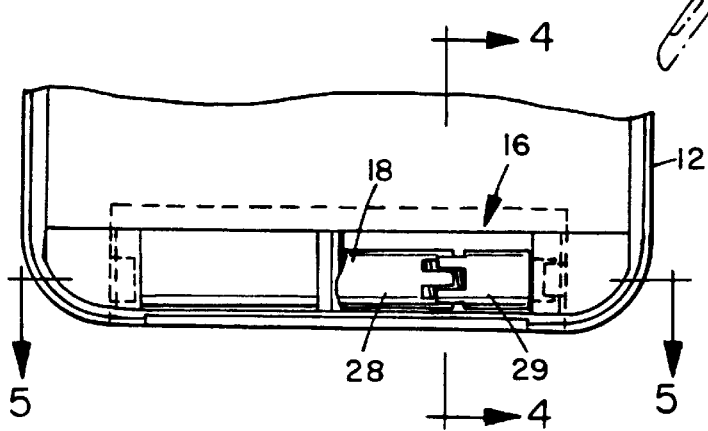
FIG. 3 is an enlarged view taken on line 3—3 of FIG. 2.
Figure 4:
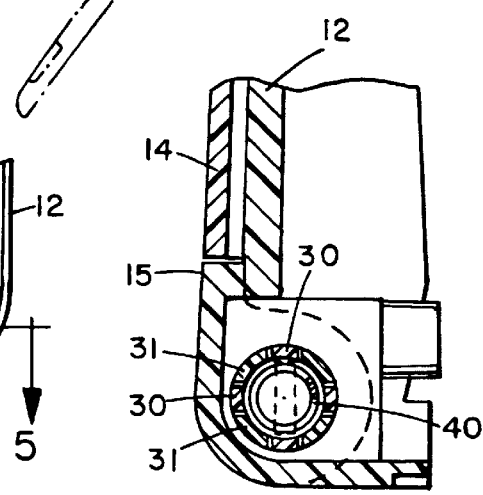
FIG. 4 is an enlarged sectional view taken on line 4—4 of FIG. 3.

FIGS. 1 and 2 of the drawings illustrate a flip or clamshell type portable phone 10 having a two part housing 12 in which the phone components are mounted and a cover 14 secured to the front part 15 of the housing by means of a hinge apparatus 16 according to a first embodiment of the invention. The hinge apparatus 16 is illustrated in more detail in FIGS. 3 to 8. The cover 14 is movable between a closed position as illustrated in FIG. 1 and in solid lines in FIG. 2, and an open position illustrated in dotted outline in FIG. 2. In the closed position, the cover or lid extends over at least part of a phone keypad. In the open position, the keypad is uncovered.

The hinge apparatus 16 is designed to releasably hold the cover in either the closed or open positions, and to provide some resistance to opening or closing the cover, while snapping the cover into the open or closed position once it is rotated a predetermined distance towards the desired position. Apparatus 16 basically comprises a cam 18 which is secured to the cover 14 and rotatably mounted in the front part 15 of the phone housing, and a follower 20 which is rigidly mounted in housing front part 15.

Figure 5:
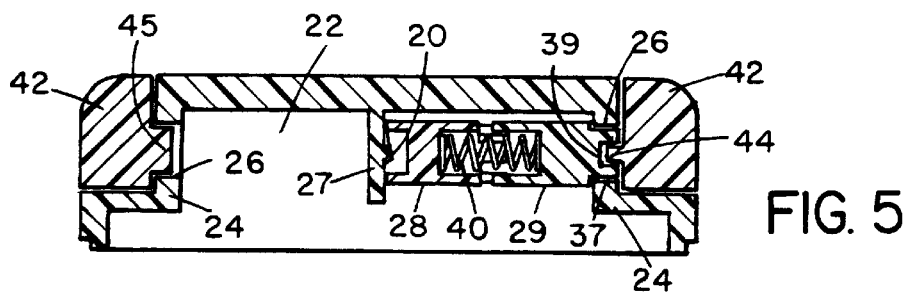
FIG. 5 is a sectional view taken on line 5—5 of FIG. 3.
Figure 6:
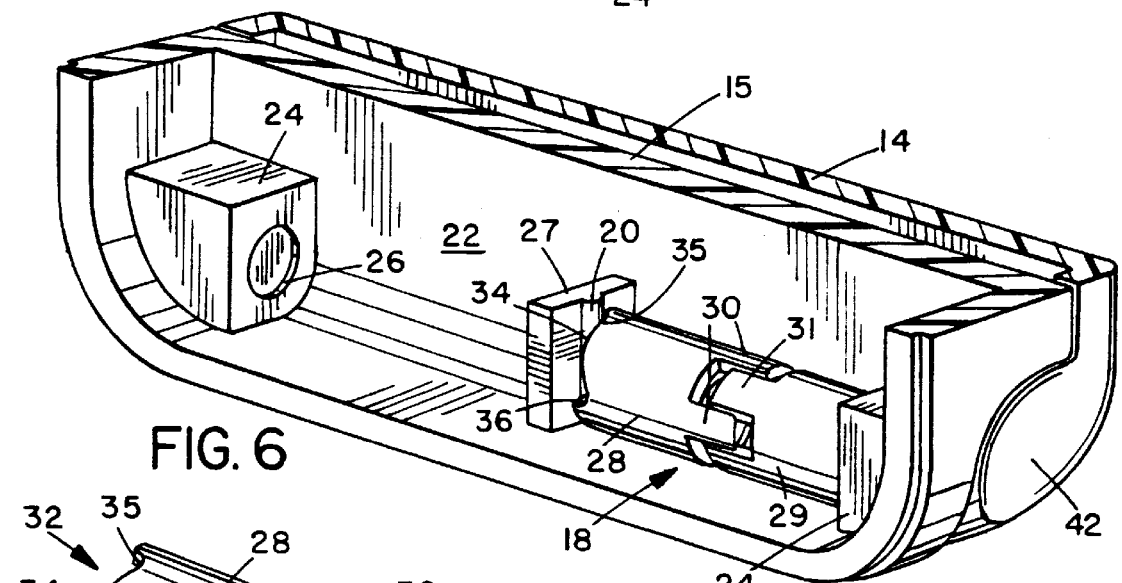
FIG. 6 is an enlarged cut away perspective view of the structure of FIG. 3.

The front part 15 of the housing is provided with a recess or chamber 22 at one end of the housing having opposite end walls 24 each having an opening 26. The follower 20 comprises a rib or protrusion on an intermediate wall 27 of the recess facing one of the end walls 24, as best illustrated in FIGS. 5 and 6.

Figure 7:
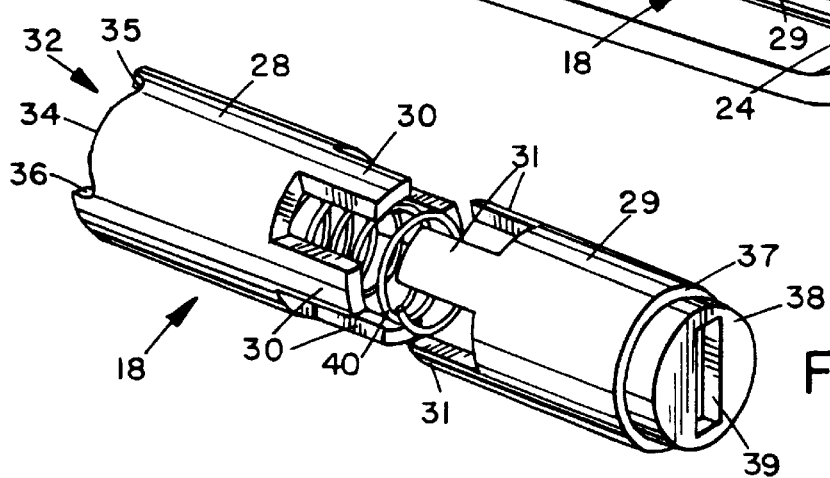
FIG. 7 is a further enlarged perspective view of the hinge components.
Figure 8:
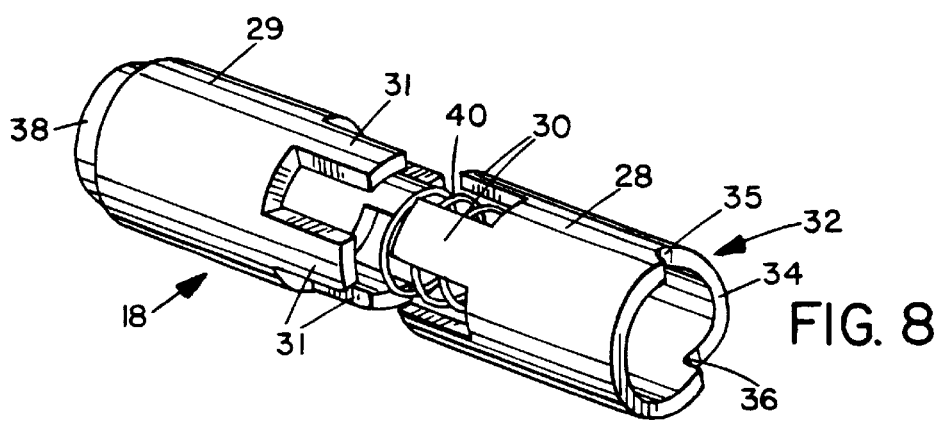
FIG. 8 is a similar view from the opposite end thereof.

The cam 18 is rotatably mounted between the intermediate wall 27 and the end wall 24 of the recess facing the follower 20. Cam 18 is illustrated in more detail in FIGS. 7 and 8, and comprises a first sleeve part 28 and a second sleeve part 29 having interlocking fingers 30, 31 respectively, at their inner ends. Fingers 30, 31 engage to prevent relative rotation between the parts but allow some relative axial movement between the parts. The first sleeve part 28 has a cam profile 32 around its outer end facing the follower 20. The cam profile is of a generally roller-coaster like shape, with a convex or curved portion 34 and first and second end notches or stops 35, 36, respectively. The second sleeve part 29 has a reduced diameter end portion 38 with a key slot 39 in the end wall, as illustrated in FIG. 7, and is rotatably mounted in the opening 26 in the recess end wall 24, as best illustrated in FIG. 5. The annular shoulder 37 formed by the reduced diameter portion rests against the end wall to limit the amount of axial expansion of the two cam parts. An internal spring 40 extending between internal walls in the two cam parts urges the parts axially apart, such that the first cam part is biased against the intermediate wall.

The cover 14 has a pair of spaced ears 42 which fit over the end walls 24 of the recess 22. One ear has a key tab 44 which engages in the key slot 39 of cam part 29 so that the cam rotates back and forth as the cover is opened and closed. The opposite ear has a boss 45 which is rotatably engaged in the opening 26 in the opposite end wall. Thus, the cover is hinged or pivoted to the housing.

Operation of the cam and follower hinge apparatus as the cover is opened and closed will now be described in more detail. The follower 20 rests in the first notch 35 of the cam profile when the cover is closed, as in FIG. 6. As the cover is opened, the cam will rotate in a clockwise direction as viewed in FIG. 6, and the cam profile will travel over the follower 20. Due to the convex portion 34 of the cam profile, spring 40 must be compressed to allow the follower 20 to move over the highest portion of the profile. There will therefore be some resistance to the initial opening movement of the cover. Once the follower 20 passes over the highest portion of the profile and starts to travel down the slope on the other side, towards notch 36, the spring will expand to snap the cam and cover around until the follower is located in notch 36, which corresponds to the desired open position of the cover.

When the cover is open, there will be similar resistance to closing of the cover and thus the cover will be held in the open position unless positively urged towards the closed position. As the cover and cam are rotated back in the anti-clockwise direction, the follower must again travel up the convex cam portion 34, and the spring 40 must compress to permit this movement. After the highest portion of the profile is passed, the spring will again expand to snap the cam back into the position illustrated in FIG. 6 in which the follower is again located in notch 35. The cover is simultaneously snapped back into the closed position.

The hinge apparatus is relatively simple to manufacture and install in a portable phone housing, and reduces complexity while providing a desirable resistance or "feel" to the opening and closing motion, as well as holding the cover in both the open and closed positions unless positively urged from those positions. At the same time, the hinge has a built-in snap action for snapping the cover into either the open or closed positions once the cover is rotated a predetermined distance towards those positions.

FIGS. 9 to 11 illustrate a modified hinge apparatus according to the invention which still involves a cam and follower action, but in this case the follower is not fixed to the phone front housing 15. As in the previous embodiment, the front housing 15 of the phone is provided with a recess 50 having opposite end walls 52 each having an opening 54, and an intermediate wall 55 which is closer to one end wall 52, as illustrated in FIG. 9. A cam sleeve 56 has a reduced diameter portion 57 at one end which rotatably engages in the opening 54 in the opposite end wall to wall 55. Portion 57 has a cam slot 58 in its outer end face for engagement with a corresponding cam tab (not illustrated) on one ear of the cover, as in the previous embodiment.

The opposite end of the cam sleeve 56 has a cam profile 59 similar to profile 32 of the previous embodiment. A cam follower member 60 is urged towards the cam sleeve 56 by a spring 62 acting between the intermediate wall 55 and the outer end of follower member 60. The member 60 has oppositely directed, axially extending ribs 64, one of which engages slidably in a slot or groove 65 extending along the lower wall of the recess 50, as illustrated in FIG. 10. A cam follower 66 extends from the inner end face 67 of the follower member 60 for engagement with the cam profile 59, as illustrated in FIGS. 9 and 11. As in the previous embodiment, the cam profile has end notches 68, 69 and a convex portion 70 extending between the end notches.

FIG. 9 illustrates the relative positions of the cam and follower when the cover is in the open position. As illustrated, the follower rests in end notch 69 and is biased into the notch by spring 62. When the cover is rotated from the open position towards the closed position, the cam sleeve 56, which is secured to the cover, will rotate in an anti-clockwise direction from the position illustrated in FIG. 9. The follower will therefore travel up the convex portion 70 of the cam profile, forcing the follower member 60 away from the cam sleeve and compressing the spring 62. There will therefore be some resistance to the initial closing movement of the cover. Once the follower clears the highest part of the convex portion 70, as in the previous embodiment, the spring will expand to force the cam sleeve to rotate around until the follower rests in the opposite end notch 68, corresponding to the closed position of the cover. The same action occurs when the cover is moved from the closed position to the open position, with the follower first traveling up the other side of convex portion 70 and compressing the spring, and the compressed spring then being released to snap the cover back into the open position.

This embodiment therefore has similar advantages to the embodiment of FIGS. 1 to 8, and will have a similar feel to the hinge, resisting initial opening or closing movement to avoid inadvertent opening or closing of the cover, and snapping the cover automatically into the open or closed positions once it the movement is sufficient to be certain that the user wishes to change the cover position.

FIGS. 12 and 13 illustrate another modified hinge apparatus. This hinge apparatus is mounted between the front part 15 of a phone housing and the cover 14 of the phone in a similar manner to the previous embodiments. However, in this embodiment, the number of parts is reduced. As in the first embodiment, in this embodiment the phone housing has an end recess 72 with end walls 74,75 each having an opening 76, and an intermediate wall 77. In this embodiment, the intermediate wall 77 is spaced a relatively short distance from one of the end walls 74 and has a cam follower or rib 78 facing the end wall 74. A one piece cam member 80 is rotatably mounted between end wall 74 and intermediate wall 77.

Cam member 80 has an enlarged diameter skirt 82 at one end having a cam profile 83 about its rim facing the follower 78. The remainder of member 80 is of reduced diameter and extends into opening 76 in the end wall 74. A series of spaced key slots 84 extend from the outer end 85 of the reduced diameter part of the member 80, for engagement with corresponding key tabs (not illustrated) in a key opening on an ear of the cover, in a similar manner to the key slot and tab engagement of the first embodiment, so that the cam member 80 rotates with the cover as it opens and closes.

As in the previous embodiments, the cam profile has a roller-coaster like shape, with spaced end notches 86,87 and a convex portion 88 between the end notches. A spring 90 surrounding the reduced diameter portion of the cam member 80 acts between end wall 74 and the shoulder 92 formed at the inner end of enlarged diameter end portion 82 so as to urge the cam profile against the follower. This version operates in exactly the same way as the previous two embodiments to provide resistance to initial opening or closing movement of the cover, and then to snap the cover into the open or closed position, depending on the direction of movement.

In each of the above embodiments, a relatively simple hinge apparatus is provided, which has only two or three parts, but which provides a relatively complex hinge action of initial resistance to movement followed by fast, snap action once a predetermined movement towards the open or closed position has been made. The hinge apparatus is relatively simple and inexpensive to manufacture and install, and provides a reliable hinge action for repeated operation of a portable phone flip cover.

Although some preferred embodiments of the invention have been described above by way of example only, it will be understood by those skilled in the field that modifications may be made to the disclosed embodiments without departing from the scope of the present invention, which is defined by the appended claims.

We claim:

1. A portable phone, comprising:
    a phone housing having a recess at one end with spaced end walls;
    a hinge assembly mounted in the recess;
    a cover secured to the hinge assembly for rotation relative to the housing between an open position and a closed position;
    the hinge assembly comprising first and second hinge parts, one of the parts comprising a cam having a cam profile and the other part comprising a follower for engaging the cam profile;
    one of the parts being secured to the cover and rotatably mounted in said recess, and the other part being secured against rotation in said recess;
    the cam profile having end stops corresponding to an open and a closed position of the cover relative to the housing, and an arcuate surface between the end stops to provide resistance to initial rotation of the cover out of the open and closed positions.

2. The phone as claimed in claim 1, wherein the arcuate surface has a crest, the hinge assembly including a spring biasing the parts together to urge the parts into end positions in which the follower engages the respective end stops, whereby the cover is snapped into the open and closed position once the follower clears the crest of the convex surface.

3. The phone as claimed in claim 1, wherein the follower is rigidly secured in said recess, and a spring is mounted in said recess to bias the cam profile against said follower.

4. The phone as claimed in claim 3, wherein the cam comprises first and second separate cam sleeves, an interlocking assembly between said cam sleeves preventing relative rotation between said sleeves and allowing relative axial movement of said sleeves, and said spring acts between said first and second cam sleeves to urge said first cam sleeve towards said follower, said cam profile being located at an outer end of said first cam sleeve.

5. The phone as claimed in claim 3, wherein said cam is rotatably mounted in said recess between an end wall of said recess and said follower, said spring biasing said cam towards said follower.

6. The phone as claimed in claim 1, wherein the follower is slidably mounted in said recess and the cam is rotatably mounted in said recess in axial alignment with said follower and secured to said cover, and a spring is located in said recess for biasing said follower towards said cam.

7. The phone as claimed in claim 1, wherein said recess has an intermediate wall between said end walls, and said cam and follower are mounted between said intermediate wall and one of said end walls.

8. The phone as claimed in claim 7, wherein said follower is located on said intermediate wall facing said cam.

9. The phone as claimed in claim 1, wherein at least one of said end walls has an opening, and said cam has an end portion rotatably mounted in said opening, said end portion having a first key formation, and the cover having a second key formation for engagement with said first key formation for securing said cam against rotation relative to said cover.

10. A portable phone, comprising:
    a phone housing having a recess at one end;
    a cover rotatably mounted on said one end of said housing for movement between a closed position covering at least a portion of said housing and an open position;
    a hinge assembly having a first part secured to said cover and rotatably mounted in said recess and a second part secured against rotation in said recess;
    one of said parts comprising a cam having a predetermined cam profile and the other of said parts comprising a cam follower contacting said cam profile; and
    the cam profile having end stops corresponding to open and closed positions of said cover and an arcuate formation between said end stops for resistance against initial movement of said cover from said open and closed positions.

11. The phone as claimed in claim 10, including a spring acting between one of said hinge parts and said housing for biasing said cam and cam follower into engagement, said arcuate formation including a raised portion, whereby said spring is initially compressed to accommodate movement of said follower along said arcuate formation and acts to snap said cover into the end position towards which said cover is moved when said follower clears said raised portion of said cam profile.

12. The phone as claimed in claim 11, wherein the follower is rigidly secured in said recess, and said spring is mounted in said recess to bias the cam profile against said follower.

13. The phone as claimed in claim 12, wherein the cam comprises first and second separate cam parts, an interlocking assembly between said cam parts preventing relative rotation between said parts and allowing relative axial movement of said parts, and said spring acts between said first and second cam parts to urge said first cam part towards said follower, said cam profile being located at an outer end of said first cam part.

14. The phone as claimed in claim 12, wherein said cam is rotatably mounted in said recess between an end wall of said recess and said follower, said spring biasing said cam towards said follower.

15. The phone as claimed in claim 10, wherein the follower is slidably mounted in said recess and the cam is rotatably mounted in said recess in axial alignment with said follower and secured to said cover, and a spring is located in said recess for biasing said follower towards said cam.

16. The phone as claimed in claim 10, wherein said recess has opposite end walls and an intermediate wall between said end walls, and said cam and follower are mounted between said intermediate wall and one of said end walls.

17. The phone as claimed in claim 16, wherein said follower is located on said intermediate wall facing said cam.

18. The phone as claimed in claim 16, wherein at least one of said end walls has an opening, and said cam has an end portion rotatably mounted in said opening, said end portion having a first key formation, and the cover having a second key formation for engagement with said first key formation for securing said cam against rotation relative to said cover.

* * * * *